United States Patent
Reuveni et al.

(10) Patent No.: US 7,529,621 B2
(45) Date of Patent: May 5, 2009

(54) COLLISION AVOIDANCE SYSTEM AND A METHOD THEREOF

(75) Inventors: Ran Reuveni, Shoham (IL); Itzhak Gal-Or, Kfar Sava (IL); Ronen Shapira, Reut (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 11/027,678

(22) Filed: Jan. 3, 2005

(65) Prior Publication Data

US 2006/0055600 A1    Mar. 16, 2006

(30) Foreign Application Priority Data

Jun. 29, 2004    (IL)    ..................................... 162767

(51) Int. Cl.
*G01S 3/02* (2006.01)
*G01S 5/14* (2006.01)

(52) U.S. Cl. ...................................... 701/301; 342/455

(58) Field of Classification Search ............. 342/29–32, 342/41, 357.14, 455; 701/301
See application file for complete search history.

(56) References Cited

U.S. PATENT DOCUMENTS

| | | | |
|---|---|---|---|
| 5,587,904 A | | 12/1996 | Ben-Yair et al. |
| 5,638,281 A | * | 6/1997 | Wang .......................... 701/301 |
| 5,872,526 A | | 2/1999 | Tognazzini |
| 6,483,454 B1 | | 11/2002 | Torre et al. |
| 6,531,978 B2 | | 3/2003 | Tran |
| 2003/0004642 A1 | | 1/2003 | Lin et al. |

FOREIGN PATENT DOCUMENTS

| | | |
|---|---|---|
| JP | 8287386 | 11/1996 |
| JP | 11271442 | 8/1999 |
| JP | 11258326 | 9/1999 |
| KR | 20010005370 | 1/2001 |
| WO | 02/39407 A1 | 5/2002 |
| WO | 03/081514 A1 | 10/2003 |

* cited by examiner

*Primary Examiner*—Thomas H Tarcza
*Assistant Examiner*—Fred H Mull
(74) *Attorney, Agent, or Firm*—The Nath Law Group; Jerald L. Meyer; Stanley N. Protigal

(57) ABSTRACT

Systems and methods relating to collision avoidance systems for rotary-winged vehicles having rotors causing a respective communication interruption are presented. An exemplary vehicle can be assigned with a unique time slot in a data link communication network for transmitting data in the form of pulses to other participants, and can include a central processing unit configured for receiving inertial motion information from an INS, position information and time synchronization from a GPS and data indicative of state information of at least one participant from a data link radio, and for producing a collision avoidance data regarding the host and the participant, and a radio controlling utility configured for receiving a pulse width, giving rise to a modulated pulse, and for generating and transmitting a repetition of substantially identical modulated pulses, each of which indicating the state information of the vehicle, thereby substantially reducing data discrepancies due to rotor interruptions.

24 Claims, 6 Drawing Sheets

COLLISION AVOIDANCE SYSTEM AND A METHOD THEREOF

FIELD OF THE INVENTION

This invention relates to collision avoidance systems and methods. More specifically the invention relates to collision avoidance systems and methods for military and commercial applications.

BACKGROUND OF THE INVENTION

In a diversity of military and commercial situations, many aircraft are required to operate in the same space, for example, in landing areas, during formation flights, during air and ground re-fueling, and many more. Such situations could be potentially dangerous for human life and property, in case one aircraft hits one or more vehicles. The potential danger of collision characterized not only mid-air and ground air traffic but also on/in water and on-ground traffic. Therefore, many efforts in the art are aimed at avoiding collisions.

U.S. Pat. No. 6,531,978 discloses a mid-air collision avoidance system (MCAS) that employs the existing design of Traffic Alert and Collision Avoidance System (TCAS) as a module and seamlessly integrates it with a customized tactical module, which is capable of providing unique tactical avoidance guidance control and display. The tactical module handles all phases of a tactical mission, including formation flight (e.g., formation fall-in, arming formation flight, engaging formation flight following, and formation brake-away), and an air-refueling sequence (e.g., rendezvous, linkup, re-fueling, and disengaging air-refueling). The tactical module divides the air space around the aircraft into advisory, caution, and warning zones and for each provides display, tone and voice alerts to facilitate pop-up avoidance guidance commands. Military aircraft can thus effectively avoid mid-air and near mid air collision situations in all three different operation modes: air traffic control (ATC) management mode, tactical mode, and a mixed mode.

US Patent Application No. 20030004642 discloses a method and system for collision avoidance, carried by each aircraft, includes a miniature MEMS (Micro Electro Mechanical Systems) IMU (Inertial Measurement Unit), a miniature GPS (Global Positioning System) receiver, a display, a data link receiver/transmitter, and a central processing system. Each aircraft carries a GPS receiver coupled with a self-contained miniature IMU for uninterrupted state determination. The state information is shared with other aircraft over an RF (Radio Frequency) data link. An intelligent display shows the relative positions of the aircraft in the immediate vicinity of the host aircraft and issues voice and flashing warnings if a collision hazard exists.

U.S. Pat. No. 6,483,454 discloses collision avoidance systems (CAS) for groups of aircraft operating in close proximity, as during formation flights or cooperative missions. Fixed and rotary airfoil aircraft with separations of 30 feet to 5 miles, for example, participate in a local radio sub-net. An aircraft receiving CAS sub-net signals derives signal transit time values representing differences between send and receive times and which are used to derive data on inter-aircraft range and closing rate. With synchronized clocks, highly-accurate one-way ranging uses assigned time slots with predetermined sub-net time-of-day timing of transmissions. Round-trip ranging operates with less accurate time synchronization, and systems may operatively select between one-way and round-trip ranging. By exchange of range and closing rate data among aircraft, 3-D data for current three-dimensional location of aircraft enables evasive action determination. Data is thus made available for provision of audio and visual flight crew communications indicating alerts and warnings of impending collision danger and appropriate evasive action.

U.S. Pat. No. 5,587,904 disclosed an air combat monitoring system comprising a plurality of GPS receivers, mountable on a corresponding plurality of aircraft, an avionics monitor for monitoring the avionics systems of the plurality of aircraft, a memory for storing information received from the GPS receivers indicating the location of the plurality of aircraft and information received from the avionics monitor in order to provide a reviewable output indication of the performance of the plurality of aircraft and an information disseminator for communicating said information among said plurality of aircraft.

There is a need in the art for a collision avoidance system and method suitable for use in low-level flight and in low-velocity flight. There is a further need in the art for a collision avoidance system and method suitable for rotary-winged vehicles (e.g. helicopters). There is a further need in the art for a collision avoidance system and method for tight formation flight.

SUMMARY OF THE INVENTION

The present invention seeks to provide an improved collision avoidance system and method. According to one embodiment of the invention, there is provided a collision avoidance system mounted onboard a host vehicle participating in a data link communication network, the system comprising:

an Inertial Navigation System (INS) providing inertial motion information;

a Global Positioning System (GPS) receiver providing position information and time synchronization;

a data link radio for receiving data indicative of state information of at least one participant vehicle;

a central processing unit configured for receiving said inertial motion information from said INS, said position information from said GPS and said data indicative of state information of said participant from the data link radio, and for producing a collision avoidance data regarding said host and said at least one participant;

at least one display unit for presenting said collision avoidance data, wherein said central processing unit is further configured, in the case that state information in respect of said participant is not received, for providing approximated data indicative of state information of said participant based on previously received data indicative of state information of said participant; and for a duration that does not exceed a predetermined value, using said approximated data for generating collision avoidance data regarding said host and said participant.

According to an embodiment of the present invention, there is provided a plurality of warning levels that includes "traffic" and a "collision" warning levels and at least one of a group consisting of: "landing" and "formation" warning levels. According to another embodiment, the collision avoidance data includes evading instructions.

According to one embodiment, the CPU is configured to produce collision avoidance data by calculating a 'traffic' risk space (TRS) and a 'collision' risk space (CRS) around the host and for predicting whether the participant invades at least the TRS or CRS within a predetermined time. According to another embodiment, the CPU is configured to calculate the trajectory of the participant based on said data indicative of state information of said participant or said approximated data.

The present invention provides for a central processing unit (CPU) for use in collision avoidance system mounted onboard a host vehicle participating in a data link communication network, said CPU being connectable to an Inertial Navigation System (INS) providing inertial motion information; a Global Positioning System (GPS) receiver providing position information and time synchronization; a data link radio for receiving data indicative of state information of at least one participant vehicle; and at least one display unit,
  wherein said central processing unit is configured for:
    receiving said inertial motion information from said INS, said position information from said GPS and said data indicative of state information of said participant from the data link radio, and for producing a collision avoidance data regarding said host and said at least one participant; and
    in the case that state information in respect of said participant is not received, for providing approximated data indicative of state information of said participant based on previously received data indicative of state information of said participant; and for a duration that do not exceeds a predetermined value, using said approximated data for generating collision avoidance data regarding said host and said participant.

The present invention further provides for a method for operating a collision avoidance system mounted onboard a host vehicle in a group of vehicles participating in a data link network for communicating there-between, the method comprising the following operations continuously carried out by said host vehicle:
  receiving via said data link network, data indicative of state information of a participant vehicle;
  based on self-measured data indicative of host state information, and said data indicative of state information of a participant vehicle, generating collision avoidance data regarding said host and said participant,
wherein in the case that state information in respect of said participant is not received, said method further comprising:
  providing approximated data indicative of state information of said participant, based on previously received data indicative of state information of said participant; and
  for a duration that do not exceeds a predetermined value, using said approximated data for generating collision avoidance data regarding said host and said participant.

According to another embodiment of the present invention, there is provided a method for operating a collision avoidance system in a group of vehicles participating in a data link network for communicating there-between data indicative of state information, each vehicle having at least two rotors and is associated with a respective communication interruption depending upon characteristics of at least one from said rotors; each vehicle is assigned with a unique time slot for transmitting data in the form of pulses, the method comprising the following operations carried out by a participant vehicle:
  providing a pulse width depending upon at least the duration of said communication interruption and said time slot, giving rise to a modulated pulse;
  generating and transmitting a repetition of substantially identical modulated pulses, each of which is indicative of the state information of said vehicle,
thereby substantially reducing data discrepancies due to rotor interruptions.

According to yet another embodiment of the present invention, there is provided a method for sharing data in a group of vehicles participating in a data link network, each vehicle having at least two rotors and is associated with a respective communication interruption depending upon characteristics of at least one rotor from said rotors; each vehicle being assigned with a unique time slot for transmitting data in the form of RF pulses, the method comprising the following operations carried out by a participant vehicle for sharing a certain data item:
  providing a pulse width depending upon at least the duration of said communication interruption and said time slot, giving rise to a modulated pulse;
  generating and transmitting a repetition of substantially identical modulated pulses, each of which is indicative of said certain data item,
  thereby substantially reducing data discrepancies due to rotor interruptions.

If required, the method for sharing data comprises a further operation for condensing the certain data item to a form that allows the generation of said modulated pulse.

According to another embodiment of the present invention, there is provided a radio control utility for use in an RF communication system including at least a central processing unit and a data link radio; said system mounted onboard a rotary-winged vehicle, said vehicle participating in a data link network; said vehicle having at least two rotors and being associated with a respective communication interruption depending upon characteristics of at least one from said rotors; said vehicle being assigned with a unique time slot for transmitting data in the form of pulses; said radio control utility being connectable to said central processing unit and data link radio and being configured for receiving a pulse width depending upon at least the duration of said communication interruption and said time slot, giving rise to a modulated pulse and for generating a repetition of substantially identical modulated pulses, each indicating the state information of said vehicle, thereby substantially reducing data discrepancies due to rotor interruptions.

The radio control utility may be operable by the central processing unit for controlling the number and the duration of each of the pulses in said repetition of pulses. The radio control utility may be employed as part of said data link radio, or as part of said central processing unit. If required, the radio control utility is further connectable to condensation means for condensing the certain data item, to a form that allows the generation of said modulated pulse.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
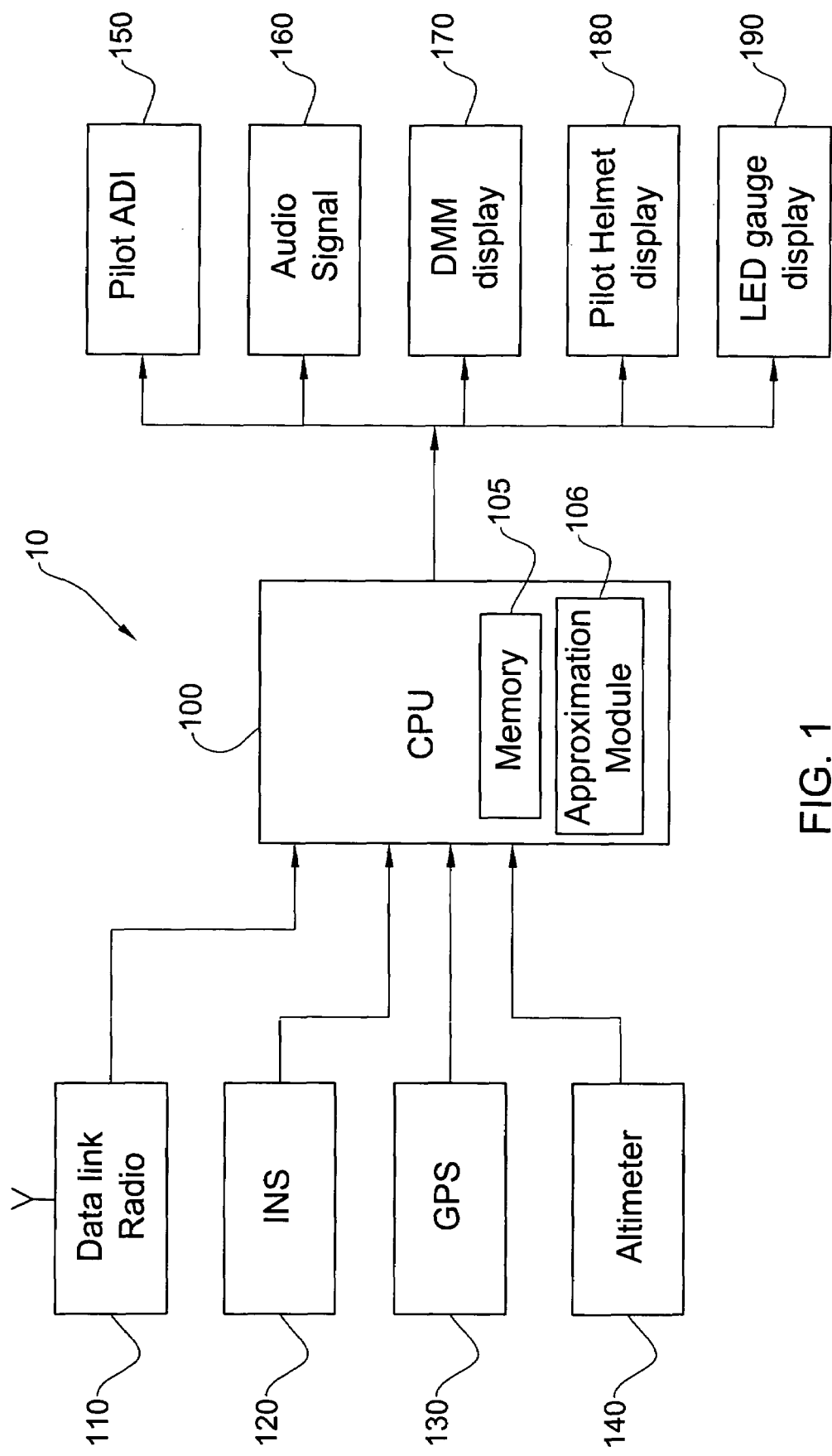
FIG. 1 is a schematic general architecture of a collision avoidance system according to an embodiment of the invention.

As is known in the art, a collision avoidance system onboard a host aircraft is responsible for alerting any predicted contact between the host aircraft and any other aircraft participating in the same communication network and sharing the same space. The collision avoidance systems are required to operate continuously in real time. Such systems require relative position and relative motion (derived e.g. from range, azimuth, and velocity) between the host aircraft and the other participating aircraft, and need 360 degrees visualization about the host aircraft.

According to one prior art approach, the collision avoidance subsystem for the host aircraft will need to frequently (at the order of a few hertz) estimate its state (i.e. the so-called "position vector") relative to other participating aircraft using onboard sensor inputs. The onboard avionics system will need to process its own sensor/s data along with data from other participating aircraft. These data inputs constitute a diverse set of state information that needs to be prioritized by the aircraft system in order to alert and prevent collisions with other participating aircraft.

It is also known in the art to define the degree to which an aircraft must be evaded by the host aircraft, and the severity of a near proximity situation, by utilizing both aircrafts' state information (e.g. "position vector") by predicting future trajectories of both vehicles, e.g. as discussed in U.S. Pat. No. 5,587,904, or by dynamic, unsafe, or risk spaces, around the host aircraft. The unsafe space represents the area in which, if violated by another aircraft, the host aircraft and perhaps the invading aircraft as well, are required to perform an evasive maneuver. These maneuvers vary from barely perceptible, to very severe, perhaps approaching the maneuverability limits of the aircraft/s. Otherwise, a collision is imminent.

The present invention follows the above-mentioned general requirements and presents an improved collision avoidance system and method, suitable for use in air, ground, and water scenes. According to one embodiment, the present invention is specifically suitable for used in low-level flight, and/or low-velocity flight, and/or tight formation flight. According to another embodiment, the present invention is specifically suitable for rotary-winged vehicles (e.g. helicopters). In the following, the present invention will be described in a non-limiting manner, mainly with respect to helicopters. It should be noted that the invention is suitable to be used with any other vehicle types.

Helicopters may be engaged in a low-level flight, e.g. under mission requirements or e.g. when approaching landing sites such as refueling sites, hospital helipads, police heliports and the like. Helicopters may be involved in tight formation flights, night formation flights and low-level formation flights. In such situations, there exists a collision risk between one or more friendly helicopters, sharing the same space at a very closed relative position.

Furthermore, a helicopter may be engaged in a flight situation that involves a non-direct line of sight between it and one or more vehicles in its vicinity (e.g. during low level formation flight). In such situations, the un-sighted vehicle may suddenly appear very near to the helicopter, leaving very short time to avoid collision.

FIG. 1 is a schematic general architecture of a collision avoidance system 10 according to an embodiment of the invention. The system 10 comprises, inter-alia, a central processing unit (CPU) 100, to which are coupled a data link radio system 110 (in turn coupled to an antenna which is not shown in FIG. 1), an Inertial Navigation System (INS) 120 providing inertial motion information, a Global Positioning System (GPS) receiver 130 providing position information and time synchronization, and optionally an altimeter 140 providing height-above-sea level information. The CPU 100 is coupled to various output display means providing visual and/or audio avoidance warnings and/or instructions, such as pilot ADI (Attitude Direction Indicator) 150, audio signal 160 (e.g. audio communication override), digital moving map (DMM) 170, pilot helmet display 180, and an LED gauge display 190. It should be noted that the invention is not limited by the kind and type of output display means and other display systems, not shown in FIG. 1, may be used without departing from the scope of the present invention.

Figure 2:
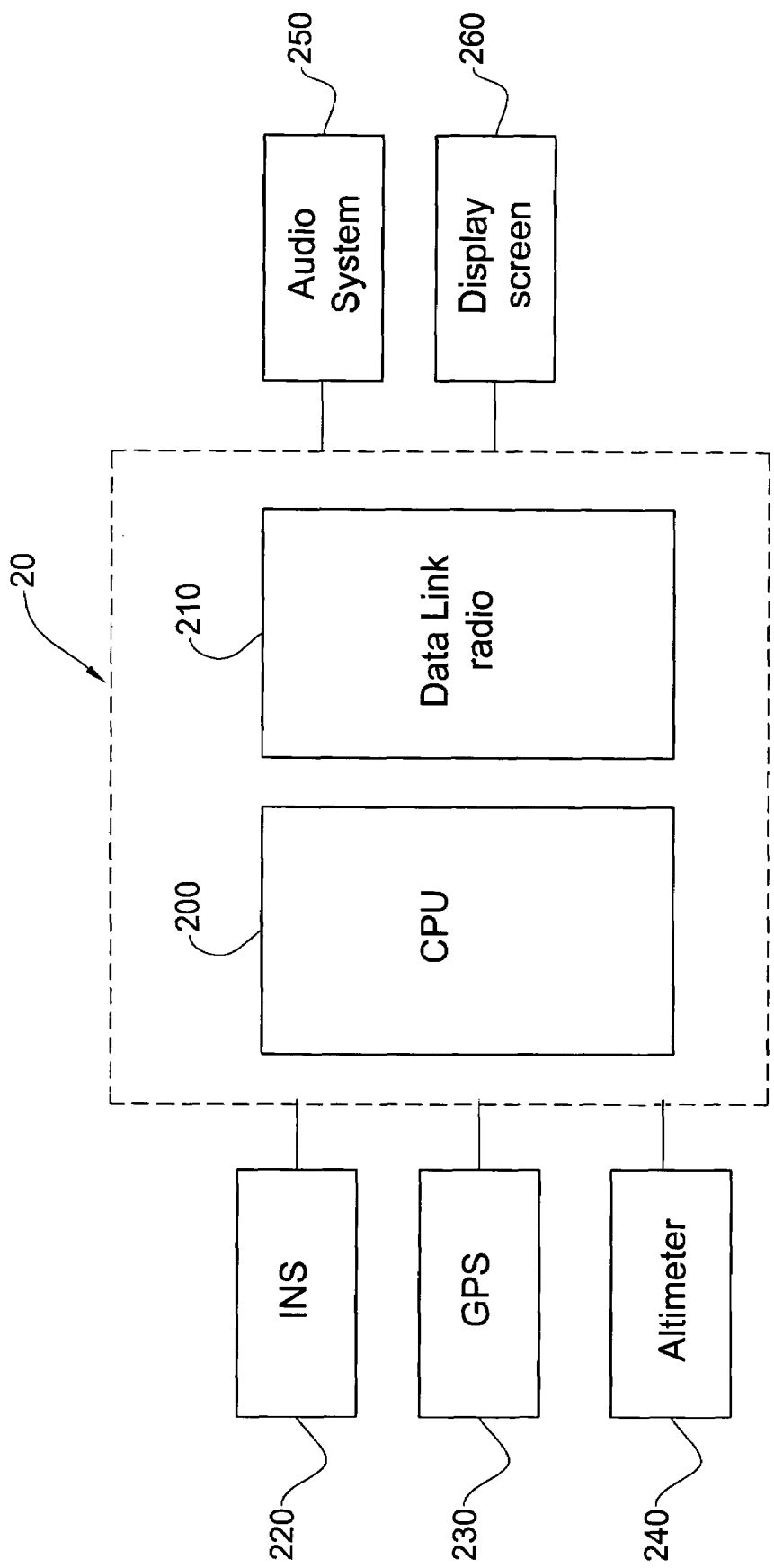
FIG. 2 is another schematic illustration of a collision avoidance system according to an embodiment of the invention.

System 10 may utilize avionics systems already mounted onboard the helicopter (e.g. data link radio, altimeter, display means). According to one embodiment, the invention may be employed in an already available vehicle by equipping it with only a hardware/software processing utility. According to another embodiment, shown in FIG. 2, the system is employed as a dedicated box 20 including a CPU 200 and data link radio 210. The box 20 is connectable, via input and output ports (not shown in FIG. 2), to avionics systems (e.g. INS 220, GPS 230, altimeter 240) and display systems (e.g. audio system 250, display screen/s 260).

Turning back to FIG. 1, the CPU 100 is configured for receiving data from other participating aircraft via data link radio 110, inertial motion information from the INS 120, position information and time synchronization from the GPS 130 and if provided, height information from the altimeter 140, and for producing a collision avoidance data such as a plurality of warning level information, that will be presented to the pilot via display means 150-190.

It should be noted that the invention is not limited by the manner for evaluating future collision risks, and any known method, e.g. as disclosed in U.S. Pat. No. 5,587,904, can be used without departing from the scope of the present invention. It should further be noted that the invention is not limited by the type, kind and source of state information used as input data for the CPU 100 as long as this state information allows for determining the relative position and relative motion of one aircraft with respect to the other.

According to an embodiment of the invention, CPU 100 comprises, inter-alia, an approximation module 106 and is coupled to a memory module 105. CPU 100 is configured, in the case that state information in respect of a certain participant is not received, for providing approximated data indicative of state information of that participant based on previously received data indicative of state information of said participant; and for a duration that does not exceed a predetermined value, using the approximated data for generating collision avoidance data regarding the host and the participant. This will be illustrated further below, with reference to FIG. 5. Note that the memory 105 can be integrated with the CPU 100.

According to an embodiment of the invention, the risk space around the host aircraft is divided to a 'traffic' risk space (leaving e.g. about 15-30 sec. alert before collision) and a 'collision' risk space (leaving e.g. about 5 sec. alert before collision), and the outputted warning information is leveled as follows:

"traffic"—indicating other vehicle/s near the helicopter within the 'traffic' risk space;

"landing"—indicating other vehicle/s near the helicopter within the 'collision' risk space, such that one of the vehicles (e.g. the other vehicle) is in landing position (e.g. already landed and is now motionless on the ground)

"formation"—indicating other vehicle/s near the helicopter within the 'collision' risk space, and sharing the same formation, such that formation positioning is interrupted;

"collision"—indicating other vehicle/s near the helicopter within the 'collision' risk space, which is not in landing position or formation position.

Figure 3A:
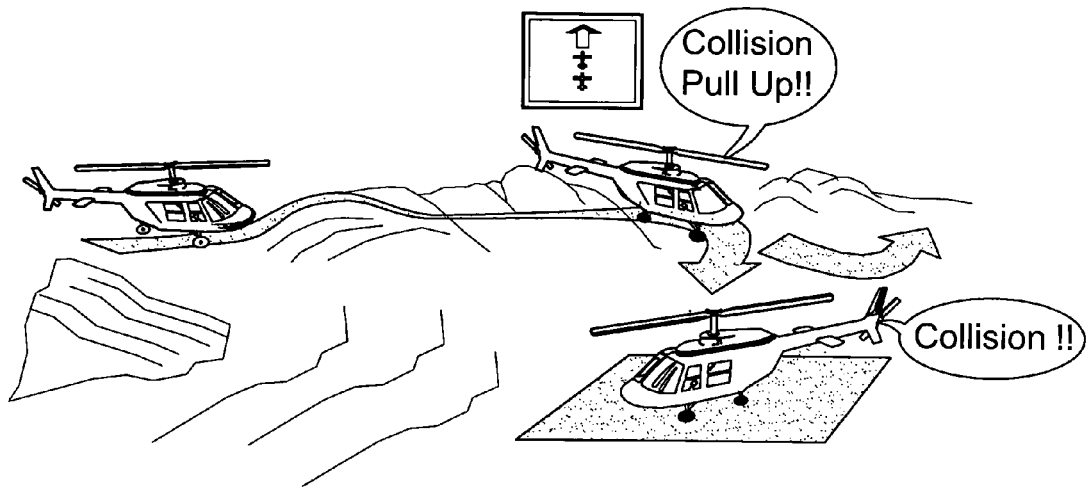
FIGS. 3a-3b illustrate the concepts of the present invention according to one embodiment thereof.
Figure 3B:
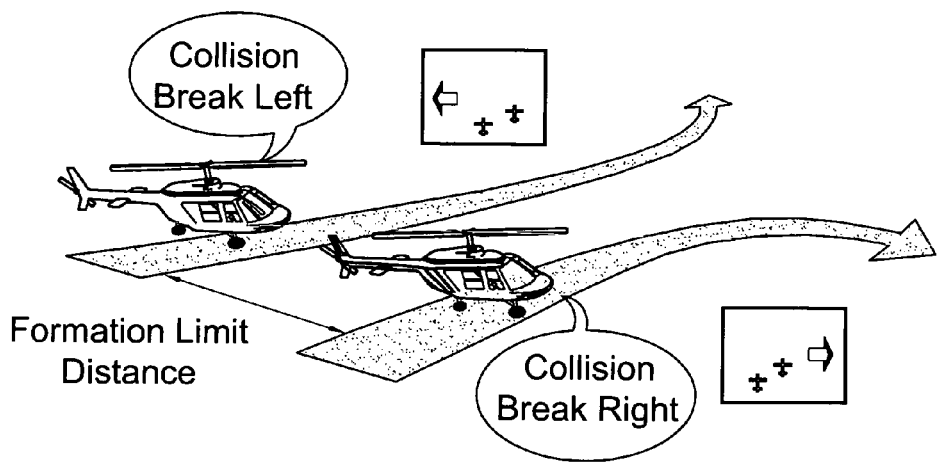

According to an embodiment of the invention, illustrated in FIGS. 3a-3b in a self-explanatory manner, the collision avoidance system provides collision avoidance warnings and instructions in accordance with the above detailed warning levels. For example, when the 'traffic' risk space is invaded, a graphic indication of the other vehicle is presented onto the DMM (this is not shown in FIGS. 3a-3b), and when 'collision' risk space is invaded, the DMM is overriden by a pop-up avoidance screen, including collision avoidance instructions. The instructions may be provided to both vehicles (for example, in "collision" or "formation" warning level, wherein both vehicles are able to maneuver), or only to one of them (for example, in "landing" warning level, the still in-flight vehicle is required to maneuver). The instructions may be provided in accordance with the flight position, e.g. one or both vehicles are required to maneuver in accordance with e.g. the formation flight limitations. FIG. 3a illustrates a "landing" warning level, showing the pop-up avoidance screen available to the in-flight helicopter, including instructions to pull-up, and audio alerts, one available to the in-flight helicopter including instructions to pull-up and/or go around, and one available to the helicopter on the ground. FIG. 3b illustrates a "formation" warning level, showing the pop-up avoidance screens available to both helicopters. As shown, each vehicle is provided with appropriate avoidance instructions, one is directed to break right and one to break left.

Figure 4:
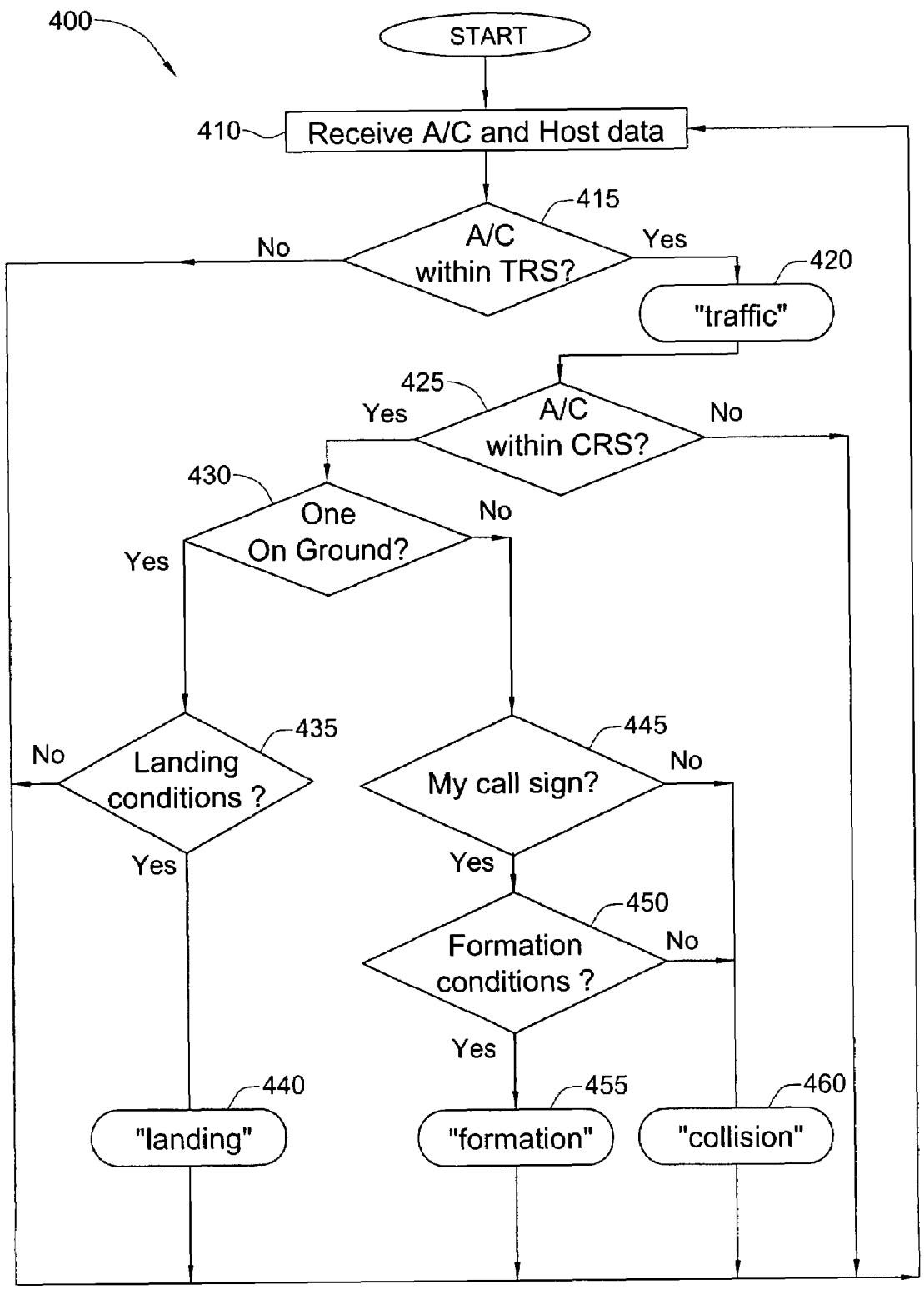
FIG. 4 is a schematic illustration of a sequence of operations according to an embodiment of the invention.

FIG. 4 is a schematic illustration of a sequence of operations 400 carried out in processing the information received from the other vehicle and from the host's own subsystems, to determine which warning level is currently applicable. The sequence of operations 400 is repeatedly carried out e.g. from initial operation of the host vehicle until shutdown. Preferably, sequence of operations 400 is carried out at a rate that falls in the range between 4 times per second to 1 time per second, thereby yielding high level of data accuracy and system credibility.

In operation 410, data from the other vehicle (hereinafter referred to as A/C) and from the host own systems, indicating both vehicle state information (i.e. range, azimuth and velocity), is received.

In operation 415, the system determines, in a manner known per-se, whether the other A/C invades the TRS 'Traffic' risk space. In the case of a negative result, the sequence of operations is forwarded to operation 410, awaiting receiving another data.

In the case of a positive result, a "traffic" warning level is determined in operation 420, and a "traffic" warning indication is displayed (not shown in FIG. 4), and the sequence of operations is forwarded to operation 425, in which the system determines, in a manner known per-se, whether the other A/C invades the CRS 'collision' risk space. In the case of a negative result, the sequence of operations is forwarded to operation 410, awaiting receiving other data.

In the case of a positive result, the system determines, in operation 430, whether one of the vehicles involved, i.e. the A/C or the host, are on the ground. This is done, e.g. by analyzing the motion data and/or the altitude data, and/or by receiving dedicated signal indicating a vehicle not in-flight.

In the case of a positive result (i.e. one vehicle is on the ground), the system selects, in operation 435, the vehicle that is in flight as responsible for avoidance maneuvering, and the "landing" warning level is determined in operation 440 with respect to the selected vehicle, thereby allowing to provide the selected vehicle with "landing" warning indications and avoidance instructions (this is not shown in FIG. 4).

In the case of a negative result (i.e. both vehicles are in flight), the system determines, in operation 445, whether both vehicles share the same formation. This is carried out e.g. in a known per-se manner, e.g. by utilizing the so-called "my call sign" signal. If the vehicles share no formation, then a "collision" warning level is determined, in operation 460.

In the case of a positive result (i.e. both vehicles share the same formation), the system determines, in operation 450, whether the formation limits are maintained or breached. If the formation limits are maintained, then a "formation" warning level is determined, in operation 455. If the formation limits are breached then a "collision" warning level is determined, in operation 460.

As described above, the pilot is provided with a "formation" alert whenever an A/C of the same formation is in its vicinity, and is provided with an accurate 'collision' alert whenever the host or the A/C dangerously breached formation limits. With respect to operation 455, the following is a description of a manner, according to an embodiment of the present invention, to evaluate if the formation is maintained or breached. According to this embodiment, the following values are determined:

the relative range between the host and A/C in the X-Y plane (parallel to the ground);
the relative range between the host and A/C along the Z axis (perpendicular to the ground);
the directivity of the relative velocity between the host and A/C;
the absolute value of the relative velocity between the host and A/C, These values define the spatial positioning of the host and A/C with respect to each other. For each of the values, a critical value is predetermined, according to e.g. mission requirements, safety regulations, vehicle type, error values of the measurements devices, and more. In other words, the critical values listed above define the formation limits which, if breached, may endanger the host as well as the A/C. For example, according to an embodiment of the present invention, the host and A/C may maintain formation limits of about 40 meter (about 130 feet) of relative range there between without the pilots being provided with a false 'collision' alert.

In operation, the status of the host and A/C is dynamically calculated and checked against the above-detailed critical values, based on the A/C data received via the data link and the host self measurements (e.g. X-Y data and velocity data from INS/GPS measurements, Z data from the altimeter).

For example, in order to assist the pilot, the present invention can provide a pilot with 'formation' alerts by presenting only visual alerts (e.g. a bleeping visual indication onto the moving map) and when a 'collision' alert is required, to render the pilot with visual alert (e.g. non-bleeping indication) accompanied with an audio alert.

With respect to operation 410, it should be noted that operation 410 is carried out in a continuous manner, depending on the resolution of the various systems involved. In order to provide accurate warnings and amicable avoidance instructions, operation 410 is carried out at least once every second and preferably, four times per second.

With respect to operation 410, it should be also noted that the A/C data might originate from the A/C itself or, in a manner known per-se, originate from one or more other participants.

Figure 5:
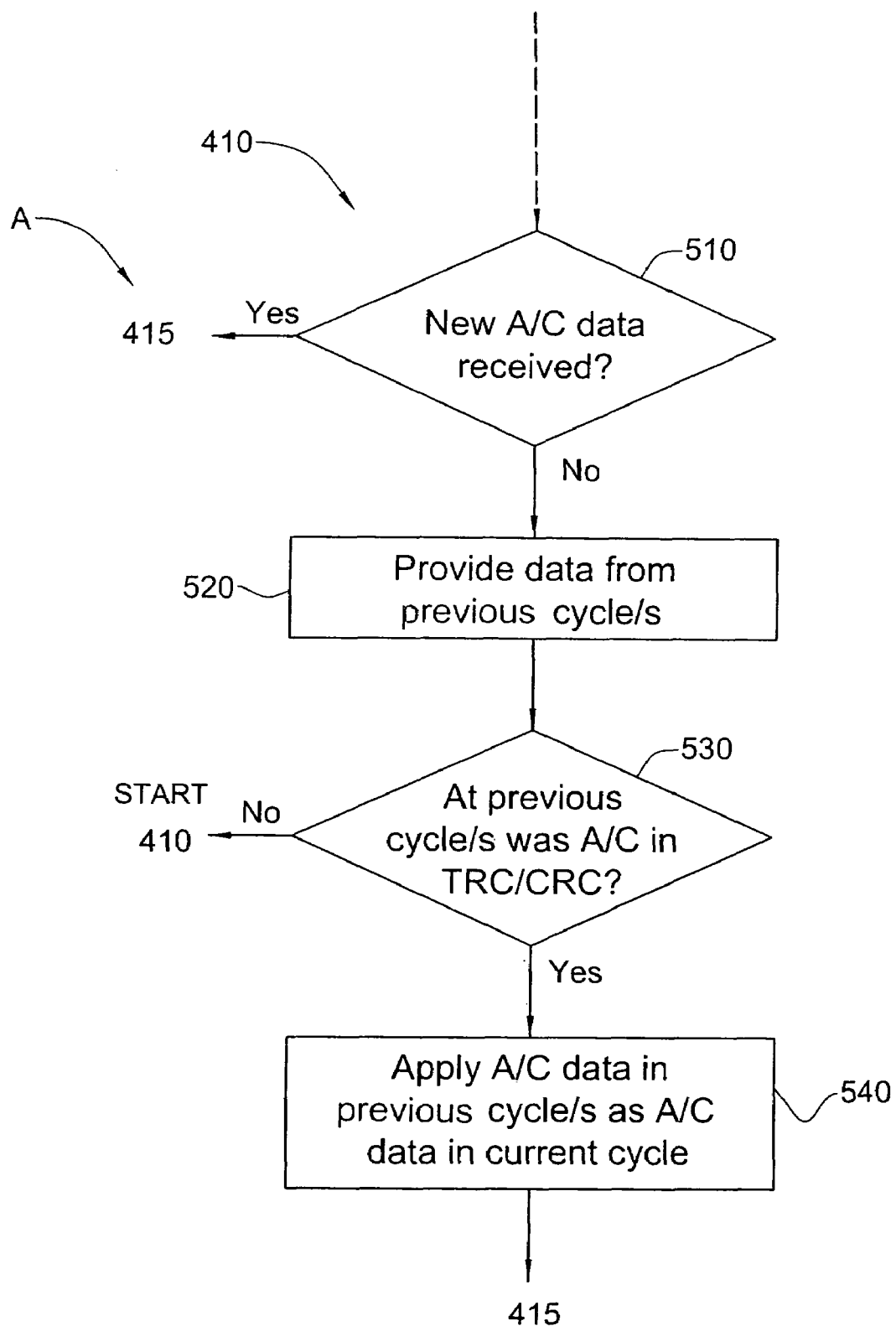
FIG. 5 is a schematic illustration of another sequence of operations according to another embodiment of the invention.

According to an embodiment of the present invention, an additional set of operations A (not shown in FIG. 4) is carried out as part of operation 410, regarding receiving A/C data, as illustrated in FIG. 5, as follows.

During operation 410, the sequence of operations A starts with operation 510, in which checking is carried out to verify whether there exist new A/C data (e.g. if new A/C data were received via the data link). In the case of a positive result, the sequence A is ended and the processing is forwarded to operation 415 and is carried out as detailed above with reference to FIG. 4. In the case of a negative result, indicating no new A/C data is available, data from the previous cycle/s is provided in operation 520, e.g. by retrieving it from e.g. a cache memory, onto which it was stored during the previous cycle/s (note that the storing operation is not shown in FIG. 4). The data of the previous cycle/s might include one or more of the following: the A/C data, the host data, the indicated risk space (i.e. TRS, CRS), the indicated warning level (i.e. "traffic", "landing", "formation", "collision") and perhaps additional data involved in sequence of operations 400 conducted at the previous cycle/s.

In operation 530, a check is made to verify whether, at the previous cycle/s, it was determined that A/C was within TRS or CRS. In case of a negative result ( indicating that at the previous cycle/s no collision risk was expected regarding A/C), sequence of operations A is ended and the processing is forwarded to operation 410, for awaiting new A/C data. In case of a positive result (indicating that at the previous cycle/s A/C was in TRS or CRS, then at operation 540, A/C data received and/or processed at the previous cycle/s is applied as the state information of A/C at the current cycle, giving rise to an approximated state information. The sequence of operation A is ended and the processing is forwarded to operation 415 and is carried out substantially as illustrated in FIG. 4, based on the approximated data that was gathered at the previous cycle/s of operation.

As described above, data received and processed at previous cycle/s is stored and if required, is used during processing of data received in the current cycle of operation. It should be noted that a variety of policies might be employed to consider data of previous cycle/s. For example, an 'end event' may be included as part of sequence of operations A, e.g. between operations 530 and 540, for controlling e.g. the duration of time for which processing is to be carried out for an A/C for which no new data was received; the number of cycles during which no new A/C data is received, and more. Note that such control scheme may consider the collision risk involved, e.g. if at a previous cycle it was determined that no risk is expected regarding a certain A/C and at the current cycle no new A/C data was received, then no further processing is carried out with respect to that A/C. According to e.g. another control scheme, the relative direction or the relative velocity between the host and the A/C is considered and in case the A/C is moving toward the host—but is yet outside TRS, then processing is continued with respect to this A/C. According to yet another control scheme, the processing is continuously carried out with respect to an A/C that shares the same formation, even when no A/C data is available.

To summarize, sequence of operations A as illustrated above is aimed at continuously following an A/C even in cycles of operations during which no new A/C data is received. A situation in which no new data A/C is available may accrue, not only when A/C is out of range, but also e.g. in low-flight situations, communication discrepancies and interruptions to and from a rotary-winged vehicle, and many more. In the above-detailed situations, there exists a collision risk between the host and the A/C, although no A/C data is available to the host. According to the present invention, as described above with reference to FIG. 5 in combination with FIG. 4, collision alerts—although based on approximated data—will continue to be provided to the host pilot, thereby rendering him more time to react to the alerts.

In rotary-winged vehicles (e.g. helicopters) equipped with RF communication means, depending upon their characteristics, the rotating blades of the rotor/s typically interrupt the propagation of RF waves to and from the RF antenna. In the context of the present invention, this problem may result in discrepancies in the information shared between the different participants of the network and consequently, decreases the overall credibility of the collision avoidance system.

This problem can be illustrated as follows: assuming a rotary-winged vehicle such as a helicopter has two rotors, a main rotor, and a tail rotor. Typically the tail rotor rotates at a higher velocity than the main rotor and therefore present a greater interruption to the propagation of RF signals to and from the helicopter. For example, consider a rotor rotating at 1200 RPM (equals to 20 RPS). If the rotor four blades, then each blade rotates at an angular speed of 80 RPS and completes a full round every 12.5 msec. This means that a blade passes a certain point on the line of sight, every 12.5 msec. Assuming this rotor has four blades, each having a 20 cm width, the duration of the interruption, which is the time during which the blades pass a certain point on the line of sight of the rotor, lasts about 3 msec. In the above-detailed example, any RF transmission to and from the helicopter during rotor operation is interrupted for about 3 msec in every 12.5 msec. In other words, a transmission to a specific point on the line of sight of the rotor will be blocked for a duration of 3 msec at every 12.5 msec. In case the RF communication involved transmission of signals during time slots of only few milliseconds, for example, 5 msec slots, the transmission will be interrupted in every second slot.

According to an embodiment of the present invention, the following technique is further employed in order to transmit the state information of one helicopter to the others without discrepancies caused due to rotor interruption. The state information is pulse-width modulated for transmission at a certain time slot such that the modulated pulse representing the state information includes several repetitions of the state information; the duration of each repetition is set to be shorter than the duration of the interruption; and the number of repetitions is set to provide at least one transmission of the state information that is not blocked. Pulse-code modulation is known per se e.g. as disclosed in U.S. Pat. No. 5,587,904.

For illustration, reference is again drawn to the above-detailed example in which the duration $D_1$ of the time slot is 5 msec, the duration of the interruption DI is 3 msec and the transmission in every second slot is interrupted. Assuming the width $D_2$ of an RF pulse representing one repetition of the state information is 1 msec, the number of repetitions k is set by the following formula:

$$D_1 - DI >= kD_2 \qquad (1)$$

In the above-detailed example, $D_1$ is 5 msec, DI is 3 msec, $D_2$ is 1 msec and therefore, according to formula (1), the number of repetitions k is 2. In another example, in which the communication system has a 10 msec time slot, the number of repetitions can be set to be between 2 to 6.

It should be noted that the above-detailed technique is not limited to be used in collision-avoidance systems and is suitable to be generally used in rotary-winged vehicles. Furthermore, the above-detailed technique is not limited for the transmission of state information as illustrated above, and can be used for the transmission of various types of data items. It should be appreciated that the above-detailed technique can be integrated with known condensation and modulation techniques, if so needed to condense the data items to a pulse having appropriate width (i.e. $D_2$ as defied by formula (1)).

In order to provide full coverage in transmission and receiving of RF signals, rotary-winged vehicles (e.g. helicopters) are equipped with two antennas located at different locations on the vehicle body. Typically, one antenna is located at a better place on top of the body thereby yielding better coverage than the other antenna. The RF signals coming to and from the antennas interfere with each other. In order to overcome this interference, according to an embodiment of the present invention, the signal to be transmitted is split between the two antennas such that the better-located antenna receives substantially more power than the other antenna (e.g. a 18 dB difference between the two antennas). As a result, at the receiving side, the low-powered signal can easily be ignored when superimposed on the high-powered signal. Only when the high-powered signal is eliminated (for example, due to blockage or disturbances), is the low-powered signal considered.

Figure 6:
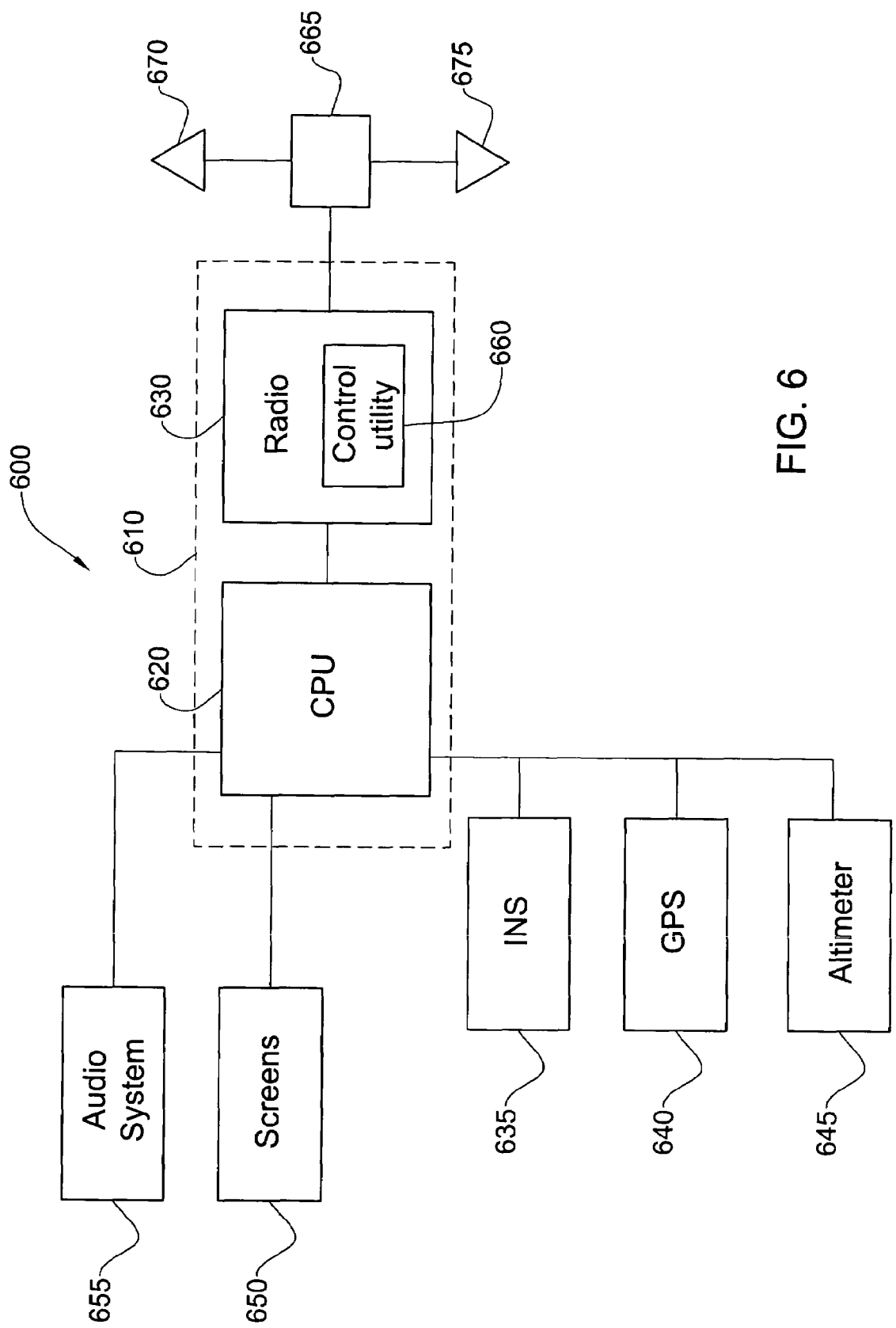
FIG. 6 is a schematic illustration of a collision avoidance system according to yet another embodiment of the invention.

Therefore, according to an embodiment of the present invention illustrated in FIG. 6, a system 600 is provided. System 600 includes, inter-alia, the following elements: a box 610 installed onboard a host vehicle and comprising, inter-alia, CPU 620 and radio 630. Box 610 further comprises ports (not shown in FIG. 6) through which CPU 620 output data to various display means, screen/s 650 and audio system 655, in the non-limiting example of FIG. 6.

Radio 630 is coupled to the CPU 620 for receiving and transmitting state information to and from the host. Radio 630 is equipped with a hardware/software control utility 660 for modulating the signal indicating the host state information in accordance with the technique discussed above with reference to formula (1), ensuring full transmission of the state information from the host to the other participants substantially without discrepancies, thereby yielding improved performance and accuracy.

According to an embodiment of the invention, A/C data that includes a repetition of pulses, each indicative of the A/C state information is received and filtered, e.g. by a filtering module integrated in the CPU 620 or the radio (not shown in FIG. 6), for determining the state information of the A/C. This may be carried out by a various techniques known per-se, e.g. by dividing the incoming signals into segments and eliminating any repetition of substantially identical segments.

According to one embodiment of the present invention, the number and the duration of each of the pulses in the above disclosed repetition of pulses are predefined (e.g. 5 repetitions of substantially identical pulses, each of which having a width of 1 msec). According to another embodiment, the radio controlling utility 660 is operable 'on the fly' by the CPU 620, thereby allowing, via appropriate interface not shown in FIG. 6, for dynamically controlling the number and the duration of each of the pulses in the repetition of pulses (preferably, number of repetitions range of 2 to 6; pulse width range of 0.5 msec. to 5 msec.).

Coupled to Radio 630 are splitter 665 and first and second antennas 670 and 675. The signal to be transmitted is split by splitter 665 between the two antennas such that the better-located antenna (e.g. antenna 670) receives substantially more power than the other antenna (e.g. a 18 dB difference between the two antennas). The splitter 665 is operable by the CPU 620 for splitting electromagnetic power between antennas 670 and 675 according to a predetermined scheme, e.g. a scheme dictated by the CPU 620.

It should be noted that the invention is not limited by the architecture exemplified in FIG. 6. Specifically, control utility 660 can be integrated within the CPU 620 or may constitute a separate utility coupled to either the CPU 620 or the radio 630.

As discussed above mainly with reference to FIGS. 1, 2, 4 and 5, the present invention utilizes both GPS and INS data of the host in order to generate its state information. As discussed, e.g. in U.S. Pat. No. 5,587,904, this allows for compensating for the shortcomings of each type of data. Specifically, INS data has high short-term accuracy but normally drifts over time, whereas GPS data has lower short-term accuracy but does not drift over time. The CPU (element 100 in FIG. 1) smooths the GPS readings with the INS data, using a suitable method such as adaptive Kalman filtering. The result of combining the INS and GPS data is a smooth position vector for the host.

According to an embodiment of the present invention, the system further comprises an inter-airborne module synchronization (not shown in FIGS. 1, 2 and 6), e.g. as discussed in U.S. Pat. No. 5,587,904. Preferably, time division multiplexing (TDM) is employed to allow each vehicle to transmit its own data pertaining to a selected point in time to the other vehicles. Preferably, all data transmitted by all aircraft during an individual time interval pertains to the same point in time.

The invention claimed is:

1. A collision avoidance system mounted onboard a rotary-winged host vehicle having a rotor causing a respective communication interruption, said host is assigned with a unique time slot in a data link communication network for transmitting data in the form of pulses to other participants, said collision avoidance system comprising:

a central processing unit configured for receiving inertial motion information from an INS, position information and time synchronization from a GPS receiver and data indicative of state information of at least one participant from a data link radio, and for producing a collision avoidance data regarding said host vehicle and said participant;

a radio controlling utility connectable to said central processing unit and said data link radio for receiving a pulse width depending upon at least a duration of said communication interruption and said time slot, giving rise to a modulated pulse; and for generating and transmitting a repetition of substantially identical modulated pulses, each of which indicate the state information of said host, thereby substantially reducing data discrepancies due to rotor interruptions; and an output device coupled to the central processing unit for providing visual and/or audio avoidance warnings and/or instructions.

2. The system according to claim 1 wherein said central processing unit is configured, in case a repetition of pulses transmitted by another participant is received by the host vehicle in its entirety or in part, to filter the received signal for determining the state information of said other participant.

3. The system of claim 1 wherein said radio controlling utility being operable by said central processing unit for controlling the number and the duration of each of the pulses in said repetition of pulses.

4. The system of claim 1 wherein said radio controlling utility being employed as part of said data link radio or as part of said central processing unit.

5. The system of claim 1 wherein said characteristics of said rotor includes at least the width of the rotor's blades and the angular velocity of the rotor.

6. The system of claim 1 wherein said host transmits its state information in a rate of 1 to 4 times per second.

7. The system of claim 1 wherein said repetition of pulses includes at least 5 substantially identical pulses.

8. The system of claim 1 wherein the duration of each pulse in said time slot is in a range of 0.5 to 5 ms.

9. The system of claim 1 wherein said data link radio includes antenna means comprising a splitter and a first and second antennas such that:

said first and second antennas are mounted on said vehicle at distinct locations thereon; and said splitter splits electromagnetic power between said first and second antennas according to a predetermined scheme.

10. A central processing unit (CPU) system for use in collision avoidance system mounted onboard a rotary-winged host vehicle assigned with a unique time slot in a data link communication network, the host vehicle having at least one rotor causing a respective communication interruption, said system comprising:

said CPU configured for receiving inertial motion information from an INS, position information and time synchronization from a GPS receiver and data indicative of state information of at least one participant from the data link radio, said central processing unit being further configured, in the case that state information in respect of said participant is not received, for providing approximated data indicative of state information of said participant based on previously received data indicative of state information of said participant and for a duration that does not exceed a predetermined value; and the central processing unit being configured to use said approximated data for producing a collision avoidance data regarding said host and said participant;

wherein said CPU is connectable to or capable of being integrated with a radio controlling utility for providing said radio controlling utility with a pulse width depending upon at least a duration of said communication interruption and said time slot, thereby enabling generating and transmitting a repetition of substantially identical modulated pulses each of which indicating the state information of said vehicle, thereby substantially reducing data discrepancies due to rotor interruptions; and the CPU being connectable to an output device for providing visual and/or audio avoidance warnings and/or instructions.

11. The central processing unit according to claim 10 wherein said central processing unit further comprises or is coupled to a filtering module capable of filtering said data indicative of state information of said participant to thereby eliminating any repetition of substantially identical segments.

12. A method for operating a collision avoidance system mounted onboard a rotary-winged host vehicle in a group of vehicles participating in a data link network for communicating therebetween, the host having a rotor causing a respective communication interruption, the method comprising the following operations continuously carried out by said host vehicle:

receiving via said data link network, data indicative of state information of a participant vehicle;

based on self-measured data indicative of host state information, and said data indicative of state information of a participant vehicle, generating collision avoidance data regarding said host and said participant, wherein in the case that state information in respect of said participant is not received, said method further comprising: providing approximated data indicative of state information of said participant, based on previously received data indicative of state information of said participant; and for a duration that does not exceeds a predetermined value, using said approximated data for generating collision avoidance data regarding said host and said participant;

generating and transmitting a repetition of substantially identical modulated pulses based on a pulse width that depends upon at least a duration of said communication interruption and a unique time slot assigned to the host, each of said modulated pulses indicating the state information of said host vehicle, thereby substantially reducing data discrepancies due to rotor interruptions; and providing visual and/or audio avoidance warnings and/or instructions.

13. A method for communicating data between at least one transmitter and at least one receiver in a data link network that assigns to each participant a respective unique time slot of known duration for transmitting data pulses therein, at least one of the transmitter and receiver being mounted in association with a rotary-winged vehicle having at least one rotor causing a respective periodic communication interruption having a duration that depends upon a characteristic of said one rotor; the method comprising:

setting a width of said data pulses based on the duration of said communication interruption and said time slot; and modulating said data pulses with data items to be transmitted by the transmitter so as to generate and transmit a train of data pulses containing repeated instances of each data item, thereby increasing a likelihood that at least one instance of each data item will be successfully conveyed.

14. The method according to claim 13, wherein each instance of each data item has a duration that is shorter than the duration of the interruption; and a sufficient number of repeated instances is provided to ensure that at least one instance of each data item is not blocked by the rotor.

15. The method according to claim 13, wherein modulating said data pulses with data items includes condensing said data items.

16. The method according to claim 13, further comprising filtering a received a train of data pulses to remove repeated instances of each data item.

17. The method according to claim 13, further comprising splitting electromagnetic power between a first antenna and a second antenna both mounted in association with different respective locations of said vehicle.

18. A transmitter for conveying data to at least one receiver in a data link network that assigns to each participant a respective unique time slot of known duration for transmitting data pulses therein, at least one of the transmitter and receiver being mounted in association with a rotary-winged vehicle having at least one rotor causing a respective periodic communication interruption having a duration that depends upon at least one characteristic of said one rotor; the transmitter comprising:

a central processing unit adapted to assign a unique time slot for transmitting data in the form of pulses; and a modulator coupled to the central processing unit for modulating said data pulses with data items to be transmitted by the transmitter so as to generate and transmit a train of data pulses containing repeated instances of each data item, thereby increasing a likelihood that at least one instance of each data item will be successfully conveyed.

19. The transmitter according to claim 18, wherein the at least one characteristic of the rotor includes at least a width of a blade of the rotor and an angular velocity of the rotor.

20. The transmitter according to claim 18, wherein the central processing unit is configured, in case a repetition of pulses transmitted by another participant is received by the vehicle in its entirety or in part, to filter a received signal for determining state information of said other participant.

21. The transmitter according to claim 18, wherein the central processing unit is adapted to control a number and a duration of the data pulses containing repeated instances of each data item.

22. The transmitter according to claim 18, wherein said modulated pulse is transmitted at a rate between 1 to 4 times per second.

23. The transmitter according to claim 18, wherein said repetition of pulses includes at least 5 substantially identical pulses.

24. The transmitter according to claim 18, wherein a duration of each pulse in said time slot is between 0.5 to 5 ms.

* * * * *